(12) United States Patent
Vlad (10) Patent No.: US 7,954,733 B2
(45) Date of Patent: *Jun. 7, 2011

(54) EGGSHELL MEMBRANE SEPARATION METHOD

(75) Inventor: Vladimir Vlad, Ames, IA (US)

(73) Assignee: Biova, L.L.C., Johnston, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/512,453

(22) Filed: Jul. 30, 2009

(65) Prior Publication Data

US 2009/0306354 A1 Dec. 10, 2009

Related U.S. Application Data

(63) Continuation of application No. 11/333,697, filed on Jan. 17, 2006, now Pat. No. 7,584,909.

(60) Provisional application No. 60/644,643, filed on Jan. 18, 2005.

(51) Int. Cl.
*B02C 19/00* (2006.01)

(52) U.S. Cl. ........ 241/1; 241/79; 241/24.15; 241/101.8; 241/301

(58) Field of Classification Search .................. 241/1, 2, 241/79, 24.15, 101.8, 301
See application file for complete search history.

(56) References Cited

U.S. PATENT DOCUMENTS

| | | |
|---|---|---|
| 2,823,215 A | 2/1958 | Downing |
| 3,194,732 A | 7/1965 | Neuhauser |
| 3,196,075 A | 7/1965 | Neuhauser |
| 4,052,009 A * | 10/1977 | Penque ............................. 241/1 |
| 4,082,856 A | 4/1978 | Zwiep et al. |
| 4,789,667 A | 12/1988 | Makino et al. |
| 5,064,941 A | 11/1991 | Davison |
| 5,415,875 A | 5/1995 | Kakoki et al. |
| 5,935,142 A | 8/1999 | Hood |
| 6,176,376 B1 * | 1/2001 | MacNeil ....................... 209/510 |
| 6,534,897 B2 | 3/2003 | Takeuchi et al. |
| 6,649,203 B1 | 11/2003 | Thoroski |
| 6,790,454 B1 | 9/2004 | Abduk Malak et al. |
| 6,899,294 B2 | 5/2005 | MacNeil |
| 7,007,806 B2 | 3/2006 | MacNeil |

(Continued)

FOREIGN PATENT DOCUMENTS

| | | |
|---|---|---|
| ES | 2 181 580 B1 | 5/2004 |
| JP | 405097897 A | 4/1993 |
| WO | 98 41326 A | 9/1998 |

OTHER PUBLICATIONS

PCT/US2006/001908 Glycon Technologies, LLC Search Report, Jul. 11, 2006.

(Continued)

*Primary Examiner* — Bena Miller (74) *Attorney, Agent, or Firm* — McKee, Voorhees & Sease, P.L.C.

(57) ABSTRACT

A method for processing unseparated egg shells is provided. The method includes placing the unseparated egg shells in a fluid tank containing a fluid mixture, applying cavitation to the fluid mixture to thereby assist in separating the egg shell membranes from the egg shells, and recovering the egg shell membranes. Preferably, the fluid mixture is recirculated to thereby provide for continuous processing of unseparated egg shells. The method may further include drying the egg shell membranes to produce dried egg shell membranes which may then be vacuum packaged for storage and/or transport. The dried egg shell membranes may then be subjected to an extraction process for extracting at least one type of polypeptide from the egg shell membranes. Collagen, hyaluronic acid, or amino acids of interest may be extracted from the egg shell membrane and purified for numerous uses.

23 Claims, 6 Drawing Sheets

U.S. PATENT DOCUMENTS

| | | | |
|---|---|---|---|
| 2002/0036244 A1* | 3/2002 | Kaully et al. | 241/1 |
| 2003/0209617 A1* | 11/2003 | MacNeil | 241/24.12 |
| 2004/0166213 A1 | 8/2004 | Thoroski | |
| 2004/0180851 A1 | 9/2004 | Long et al. | |
| 2008/0206410 A1 | 8/2008 | Efstathiou et al. | |

OTHER PUBLICATIONS

Database WPI, Section Ch, Week 200433, Derwent Publications Ltd., London, GB; XP002384231 ES 2 181 580 B1 (BDN ING Alimentacion SL) Abstract May 16, 2004.

* cited by examiner

EGGSHELL MEMBRANE SEPARATION METHOD

RELATED APPLICATIONS

This is a continuation of U.S. patent application Ser. No. 11/333,697 filed, Jan. 17, 2006, which claims priority to U.S. Provisional Patent Application Ser. No. 60/644,643, filed Jan. 18, 2005, incorporated by reference herein in its entirety.

BACKGROUND OF THE INVENTION

The present invention relates to methods, apparatus, and a system for eggshell membrane separation and a purified form of egg shell membranes produced by the separation method. The present invention addresses a number of different problems, some of which may seem unrelated without having the benefit of this disclosure. The problems include, but are not limited to, the costs associated with landfill disposal of egg shell membranes, the need for elemental calcium for various uses, and the need for collagen and other materials naturally present in egg shell membranes. Some of these problems are discussed in U.S. Pub No. 2003/0209617A1 to MacNeil, U.S. Pat. No. 6,649,203B1 to Thoroski, U.S. Pub No. 2004/0166213A1 to Thoroski, and U.S. Pat. No. 6,790,454B1 to Abdul Malak et al, all of which are incorporated by reference herein, each in its entirety.

In the U.S., there has been increased consumption of eggs during the 1990s. In 1997, over 5,000 tons of eggshell membranes have been available on the U.S. market. A related problem to the processing necessary to support this magnitude of egg processing is the cost for landfill disposal of eggshell membranes. This waste material created additional problems as it is further observed that this type of hatchery waste material is considered to be odiferous.

Eggshell powder is used in the food industry, including animal and human nutritional supplements. Eggshells provide approximately 36-37 percent elemental calcium in addition to traces of phosphorous and other trace elements. Thus, for example, 500 mg of dried powdered eggshell provides approximately 180 mg elemental calcium. This compared vary favorably to other calcium salts. For example, calcium carbonate provides 40 percent elemental calcium, calcium citrate provides 21 percent elemental calcium, calcium lactate provides 13 percent elemental calcium, calcium gluconate provides 9 percent elemental calcium, dicalcium phosphate provides 23 percent elemental calcium (and 19 percent phosphorus), and bone meal provides 20 percent elemental calcium (and 17 percent phosphorus). A single large eggshell has a mass of approximately 6 g and provides approximately 2200 mg of calcium.

In addition to potential uses of the egg shell, the egg shell membrane is known for being rich in a number of different materials, including, without limitation collagen, hyaluronic acid, lysine, histidine, arginine, threonine, glutamic acid, proline, glysine, cysteine, valine, methionine, isoleucine, leucine, tyrosine, phenylalanine and tryptophan. Some of these materials are well known as high value materials, yet due to various problems, these materials go to waste. For example, consider that approximately 10 percent of an eggshell membrane is collagen type I, V, and X. Over 300 tons of collagen is theoretically available. Collagen has a number of biomedical uses, wound dressing, including in skin grafts, tissue replacement products, plastic surgery, angioplasty sleeves, cornea repair, cornea implants, prosthetic implants, and other applications. Collagen is also used in the cosmetic industry.

Collagen constitutes about 20 to 30 percent of the total body protein in vertebrates. It is a fibrous protein and functions primarily as a supporting tissue and scaffolding for other proteins and cells. It is present throughout the body but exists in high concentrations in skin, tendon, and bone. Collagen is recovered from these tissues by a variety of techniques the oldest known method being the boiling of the tissue in water which denatures some of the collagen and forms the well-known gelatin upon cooling. For use as a biomaterial, however, collagen must be recovered in native, undenatured form, with little or no destruction of the basic rigid triple helical structure (tropocollagen).

Undenatured native collagen is recovered principally by two methods. The first method is in solution by dissolving the collagen in acids, bases, salts, or by enzyme digestion in which case the collage becomes actually dissolved. The second method involves extraction in solid, undissolved, fiber form usually by the action of aqueous salt on minced, comminuted collagen raw material to produce a dispersion from which the solid is recovered by centrifuge.

Hyaluronic acid is another example of a high value material which is naturally present in and a constituent of egg shell membranes. U.S. Pat. No. 6,946,551 to Long et al. generally discloses deriving hyaluronic acid from eggshell membranes. Hyaluronic acid can be used in various applications including cosmetics, eye drops, nutraceuticals, and various other medical applications.

Thus, it is clear that it would be highly advantageous if collagen, hyaluronic acid or other materials could be commercially extracted from egg shell membranes. Despite the general recognition of the tremendous potential value of egg shell membranes when its constituents are extracted, little has been done to realize this value. Thus hatchery waste continues to included unseparated egg shells which is still being sent to land fills. The present inventor has recognized and discovered numerous problems that prevent the use of egg shell membranes. Including problems which prevent hatcheries from separating egg shell membranes in a useable form. The present invention has also recognized specific problems in the context commercial context which provide additional challenges not present in a laboratory environment and heretofore unappreciated.

One of the problems relates to environmental and sanitary conditions associated with a hatchery. Present day production processes were not designed with the idea of separating egg shell membranes from egg shells and then extracting egg shell membranes. Present day hatcheries are likely to have bacteria in sufficient amounts to contaminate eggshell membranes during the process of separation.

Another problem relates to the need for a production process for egg shell membrane separation which is continuous. In the hatchery environment, hatchery waste is being continuously produced, and therefore it would be highly desirable for egg shell membranes to be separated from egg shells continuously as well. To not do so, would create significant problems in that either hatchery operation would be slowed, not all hatchery waste would be processed, hatchery waste would need to be processed when other hatchery operations were offline, or similar problems which would be unacceptable in the hatchery environment.

Therefore it is a primary object, feature, or advantage of the present invention to improve upon the state of the art.

It is a further object, feature, or advantage of the present invention to reduce waste used in egg processing.

Another object, feature, or advantage of the present invention is to produce egg shell powder from what would otherwise be egg processing waste material.

Yet another object, feature, or advantage of the present invention is to produce high value produces such as collagen, hyaluronic acid, or other types of polypeptides from what would otherwise be egg processing waste material.

A still further object of the present invention is to produce new revenue streams for hatcheries and egg producers.

Yet a further object, feature, or advantage of the present invention is to provide a method for separating egg shell membranes from egg shells.

A still further object, feature, or advantage of the present invention is to provide a method that reduces pathogens and contaminants in powderized egg shells and eggshell membranes.

Another object, feature, or advantage of the present invention is to provide for reducing odor associated with egg processing and egg waste.

A further object, feature, or advantage of the present invention is to provide for continuous processing of egg shells.

Another object, feature, or advantage of the present invention is to provide for automated processing of egg shells.

Yet another object, feature, or advantage of the present invention is to provide for methods, apparatus, and systems for processing egg shells that are scaleable.

A further object, feature, or advantage of the present invention is to provide for methods, apparatus, and systems for processing egg shells that are cost effective.

A yet further object, feature, or advantage of the present invention is to provide for a systems for processing egg shells that is portable.

A still further object, feature, or advantage of the present invention is to provide for methods, apparatus, and systems for processing egg shells that does not damage collagen, hyaluronic acid or other materials to be extracted.

A still further object, feature, or advantage of the present invention is to provide for a method of processing egg shells which allows extraction processes to be performed on egg shell membranes at locations remote from egg hatcheries.

One or more of these and/or other objects, features, and advantages of the present invention will become apparent from the specification and claims that follow.

BRIEF SUMMARY OF THE INVENTION

According to one aspect of the present invention, a method for processing unseparated egg shells is provided. The method includes separating egg shell membranes from the egg shells, drying the egg shell membranes, and processing the egg shell membranes after drying to extract at least one type of polypeptide from the egg shell membranes. The step of separating can include placing the unseparated egg shells in a fluid tank containing a fluid mixture, applying cavitation to thereby separate the egg shell membranes from the egg shells, recovering the egg shell membranes, and recovering the egg shells. Preferably, the step of separating egg shell membranes from the egg shells is performed by equipment which provides for continuous processing of unseparated egg shells. The process also preferably includes recirculating the fluid mixture.

The drying process preferably includes drying the egg shell membranes to a moisture content of between 3 percent and 10 percent by weight. The step of drying is performed at a temperature which preserves the at least one polypeptide. For example, where the type of polypeptides to extract is collagen, the temperature should be less than the melting temperature for collagen, and preferably less than about 40 degrees Celsius. Preferably the drying is infrared drying.

After drying the egg shell membranes may be vacuum packaged to facilitate storage or transport of the egg shell membranes for later extraction processing. The egg shell membranes can be further processed at a location remote from the location where the separation process occurs. During extraction, the polypeptide extracted may be an amino acid such as lysine, histidine, arginine, threonine, glutamic acid, proline, glysine, cysteine, valine, methionine, isoleucine, leucine, tyrosine, phenylalanine, or tryptophan. The polypeptide may be a protein, may be collagen, hyaluronic acid, or other material of high value.

According to another aspect of the present invention, a method for processing unseparated egg shells is provided. The method includes placing the unseparated egg shells in a fluid tank containing a fluid mixture, such as a mixture of distilled water and acetic acid, applying cavitation to thereby assist in separating the egg shell membranes from the egg shells, recovering the egg shell membranes, and recirculating the mixture of distilled water and acetic acid to thereby provide for continuous processing of unseparated egg shells. The method may further include recovering the egg shells and grinding the egg shells to produce egg shell powder. Also, the method may further include drying the egg shell membranes to produce dried egg shell membranes which may then be vacuum packaged for storage and/or transport. The dried egg shell membranes may then be subjected to an extraction process for extracting at least one type of polypeptide from the egg shell membranes. Collagen, hyaluronic acid, or amino acids of interest may be extracted from the egg shell membrane and purified for numerous uses.

According to another aspect of the present invention, a system for processing unseparated egg shells is provided. The system includes a fluid container containing a fluid mixture, the fluid container having an inlet and an outlet. The system also includes a mixer adapted for applying cavitation to the fluid mixture to thereby assist in separating egg shells from egg shell membranes and to move the fluid mixture from the inlet to the outlet. There is at least one sieve positioned proximate the outlet to further assist in separating the egg shells from the egg shell membranes. There is also a means for recovering the fluid mixture at the outlet and providing the fluid mixture to the inlet to thereby provide for continuous processing of unseparated egg shells.

DETAILED DESCRIPTION OF THE PREFERRED EMBODIMENT

The present invention provides for separation of eggshell membranes from egg shells in a manner which provides for significant advantages and benefits. In particular, but without limitation, the present invention provides for separation of eggshell membranes from egg shells in a manner which allows for continuous processing such that the separation can occur at a hatchery, in a manner which reduces pathogens in the eggshell membranes, in a manner which prevents damage to high value materials within the egg shell membranes (such as, but not limited to collagen or hyaluronic acid), and in a manner which provides for preserving the egg shell membranes for storage or transport.

Figure 1:
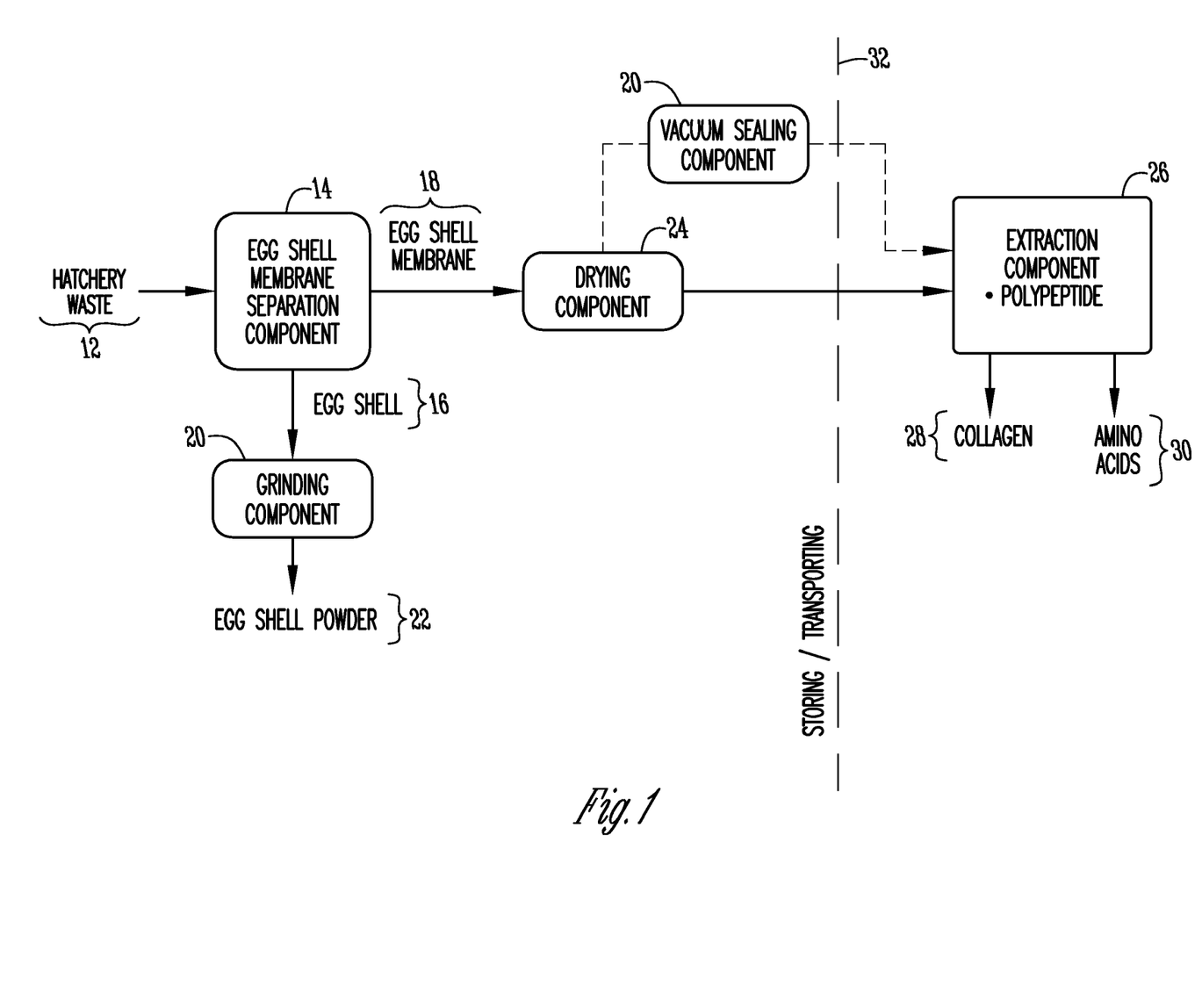
FIG. 1 is a block diagram which provides an overview of one embodiment of the system of the present invention.

FIG. 1 is a block diagram which provides an overview of one embodiment of the system 10 of the present invention. As shown in FIG. 1, hatchery waste 12 is received. The hatchery waste 12 consists of unseparated egg shells and egg shell membranes that remain after the cracking process. Although the term "unseparated" is used, it is to be understood that there may be some degree of separation at this point. This hatchery waste 12 is received at an egg shell membrane separation component 14. The present invention contemplates numerous embodiments for the egg shell membrane separation component, and preferred embodiments will be described in greater detail later herein. It is preferred that the egg shell membrane separation component 14 provide for continuous processing of hatchery waste 12. The egg shell membrane separation component 14 outputs egg shell membranes 18 and egg shells 16 each type of resulting product may then be separately processed. The egg shells 16 are conveyed to a grinding component 20 in order to produce eggshell powder 22. The egg shell powder can be used in numerous ways, including in animal nutrition, as a human nutritional supplement, or otherwise.

The eggshell membranes 18 are then received at a drying component 24. The drying component 24 preferably provides for infrared drying. After drying, the egg shell membranes are conveyed to an extraction component 26. The egg shell membranes are preferably conveyed to a vacuum packaging component 34 to package the egg shell membranes in a bag or otherwise in order to preserve the egg shell membranes for storage or transporting 32.

The extraction component 26 provides for extracting one or more materials from the eggshell membranes. Although various types of polypeptides may be extracted, of particular interest is collagen 28, and various amino acids 30, including hyaluronic acid (HA) 30. Such materials are high value materials which are difficult and/or expensive to obtain from other sources.

Figure 2:
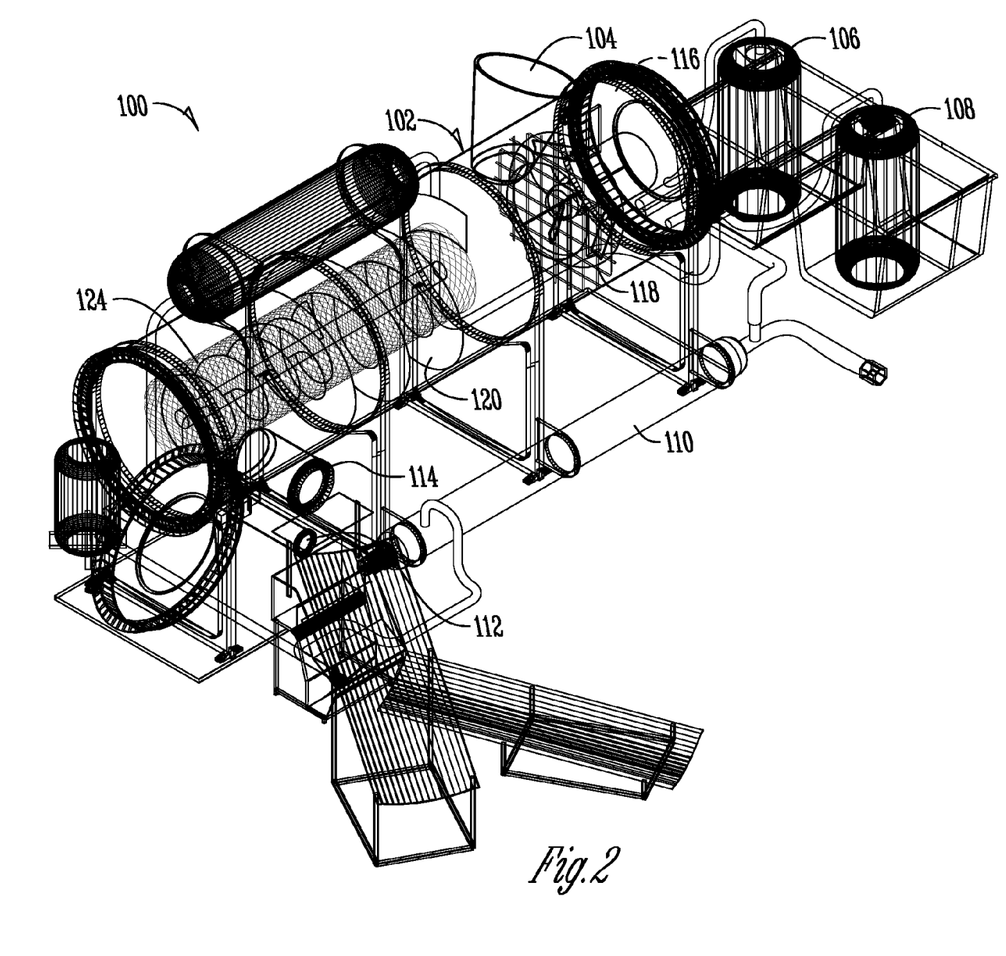
FIG. 2 is a perspective view illustrating one embodiment of an egg shell membrane separation component which provides for continuous processing.

FIG. 2 is a perspective view illustrating one embodiment of an egg shell membrane separation component 100 which provides for continuous processing. The system 100 includes a main tank 102 for containing a fluid mixture of distilled water received from the distilled water tank 106 and acetic acid received from the acetic acid tank 108. Although the present invention contemplates that different ratios of water and acetic acid can be used, one such ratio is approximately 1 part water (preferably distilled water) and 1 part 5 percent acetic acid. Such a solution comprises approximately 2.5 percent acetic acid. The use of acetic acid or vinegar assists in eliminating odors as well as killing pathogens such as bacteria and viruses.

Figure 3:
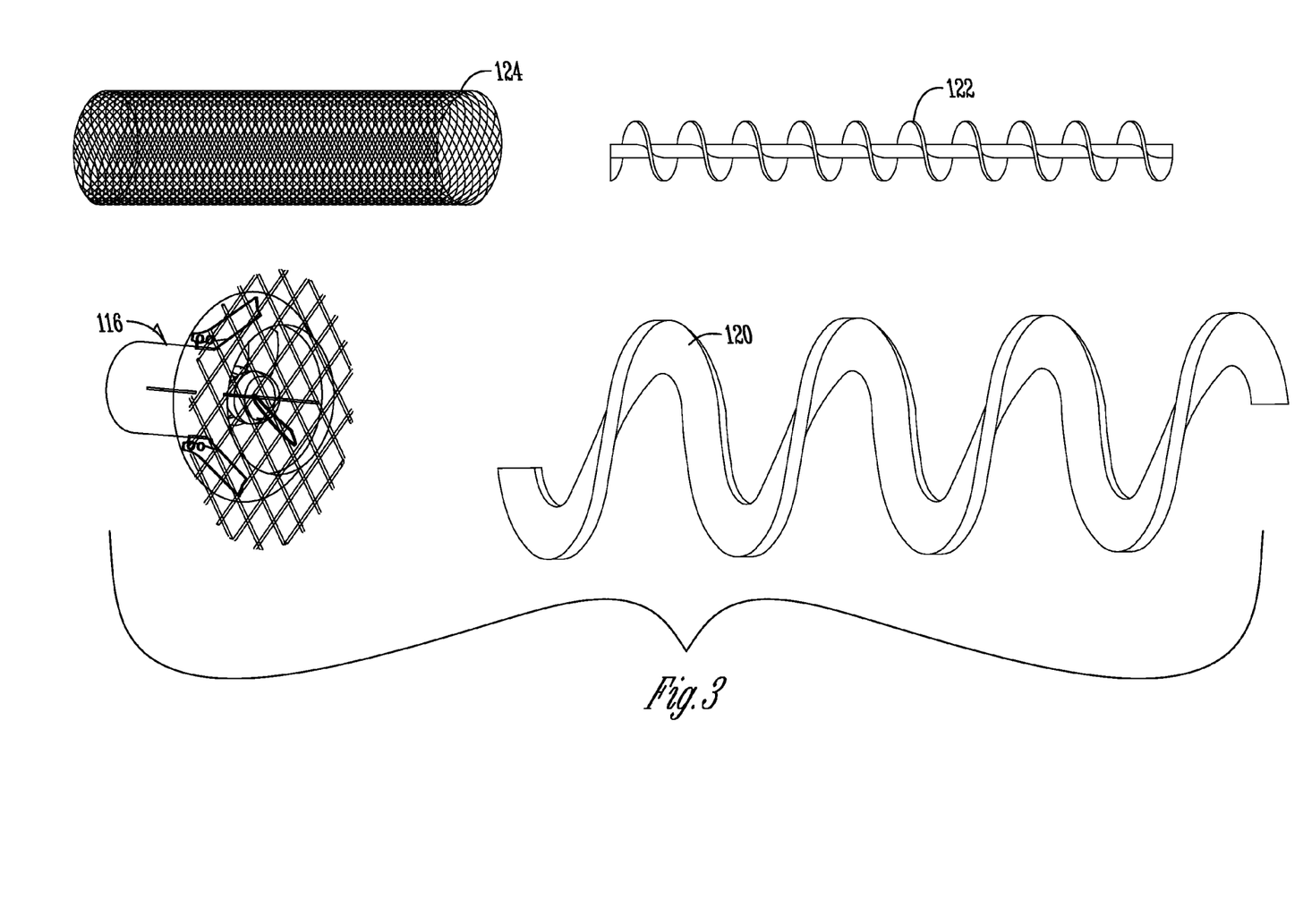
FIG. 3 is a perspective view illustrating internal structure within the egg shell membrane separation component shown in FIG. 2.

An insertion cone 104 or funnel is shown for receiving unseparated egg shells. In this particular embodiment, the unseparated egg shells are placed within mesh containers, such as, but not limited to mesh bags. In other embodiments, mesh containers need not be used. The mesh containers are then inserted into the insertion cone 104. Within the main tank 102 is a mixer 116 which is best shown in FIG. 3. The mixer 116 can be a submersible mixer which is commercially available from Flygt, but may be of other type or design. Preferably there is a protective mesh screen 118 to protect the mixer 116 as shown in FIG. 3. The mixer 116 produces fluid flow to assist in separating the eggshell membranes from the egg shells. The movement of the fluid turns an outer auger 120 and drives the mesh bags through the tank 102. An inner auger 122 is used drive the egg shells through the tank 102.

The structure of the outer auger 120 and the inner auger 122 is best shown in FIG. 3. There is an inner mesh sleeve 124 around the inner auger 122 to protect the mesh bags from the inner auger 122. The inner mesh sleeve 124 is also best shown in FIG. 3. Friction forces assist in separating the egg shell membranes from the egg shells. As shown in FIG. 2, a calcium outlet 112 is shown on the opposite end of main tank for collecting the egg shells. A mesh bag outlet 114 is shown for collecting the mesh bags containing egg shell membranes. Fluid from the separation process is recycled. A fluid recycle tank 110 is shown. Note that the embodiment shown in FIG. 2 allows for continuous egg shell separation processing which is highly desirable in the environment of a hatchery where a continuous process produces hatchery waste in the form of unseparated egg shells.

Figure 4:
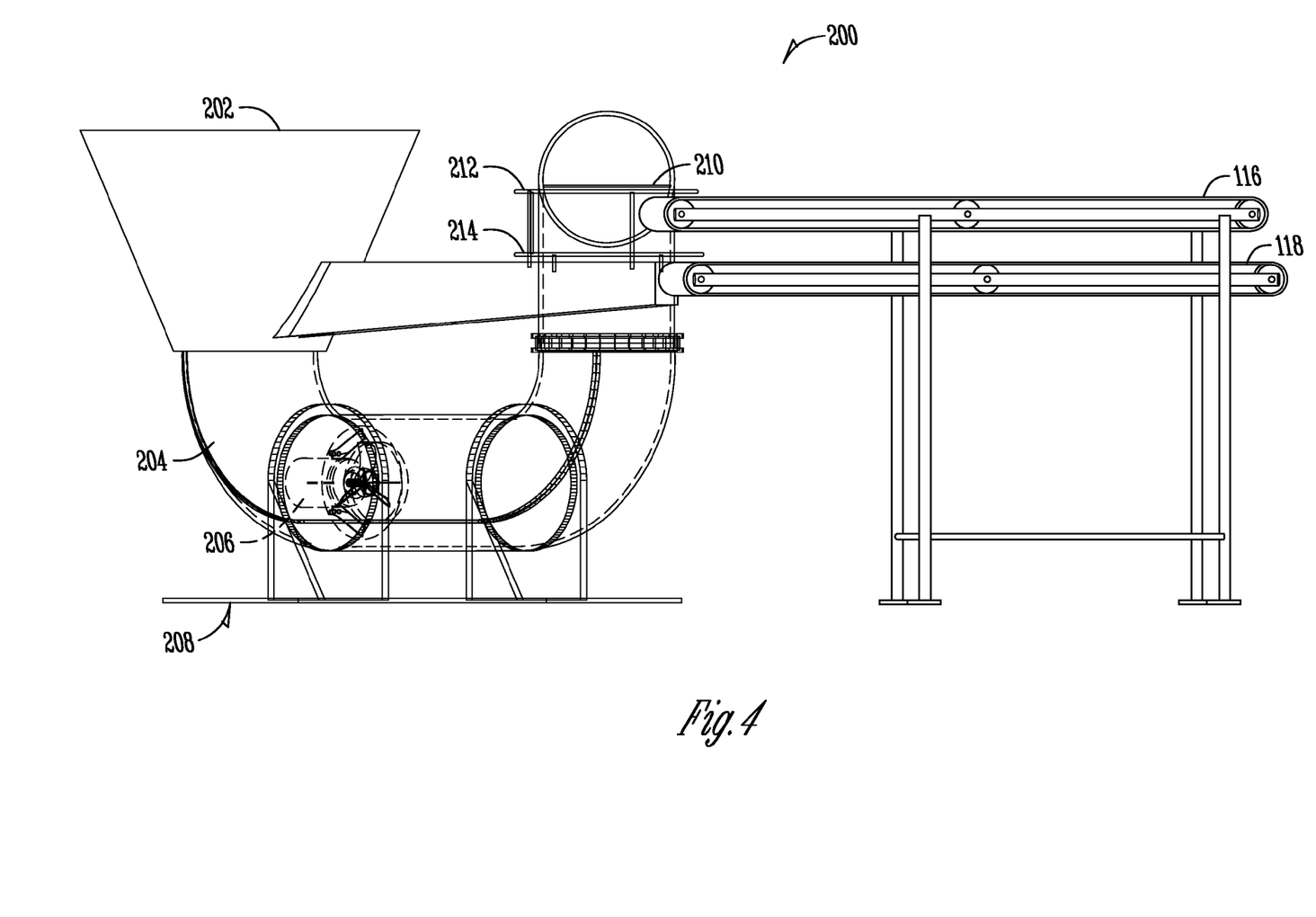
FIG. 4 is a front view of another embodiment of an egg shell membrane separation component which provides for continuous processing.

FIG. 4 is a front view of another embodiment of an egg shell membrane separation component which provides for continuous processing. This embodiment may sometimes be referred to as a U-turn embodiment. In the egg shell membrane separation component 200 of FIG. 4, a funnel 202 is shown for receiving unseparated egg shells. Note that in this embodiment, no mesh containers need be used, instead the unseparated egg shells are placed directly in the funnel 202. The funnel leads to an inlet for a conduit or pipe 204. The pipe 204 may be composed of a plastic material such as polyvinyl chloride (PVC). The pipe 204 is generally shaped to include a U-turn. Within the pipe 204 is a mixer 206, such as a submersible mixer commercially available from Flygt. The mixer provides for cavitation within the pipe to drive fluid and eggshells through the pipe and thereby assist in the separation process. A support structure 208 is shown for supporting the pipe 204. In addition, a pipe separator 210, first sieve 212, and second sieve 214 are shown. The pipe separator 210, first sieve 212, and second sieve 214 assist in collecting the egg shells separately from the egg shell membranes. The egg shell membranes are separated onto a conveyor 216 while the egg shells are separated onto a conveyor 218.

Figure 5:
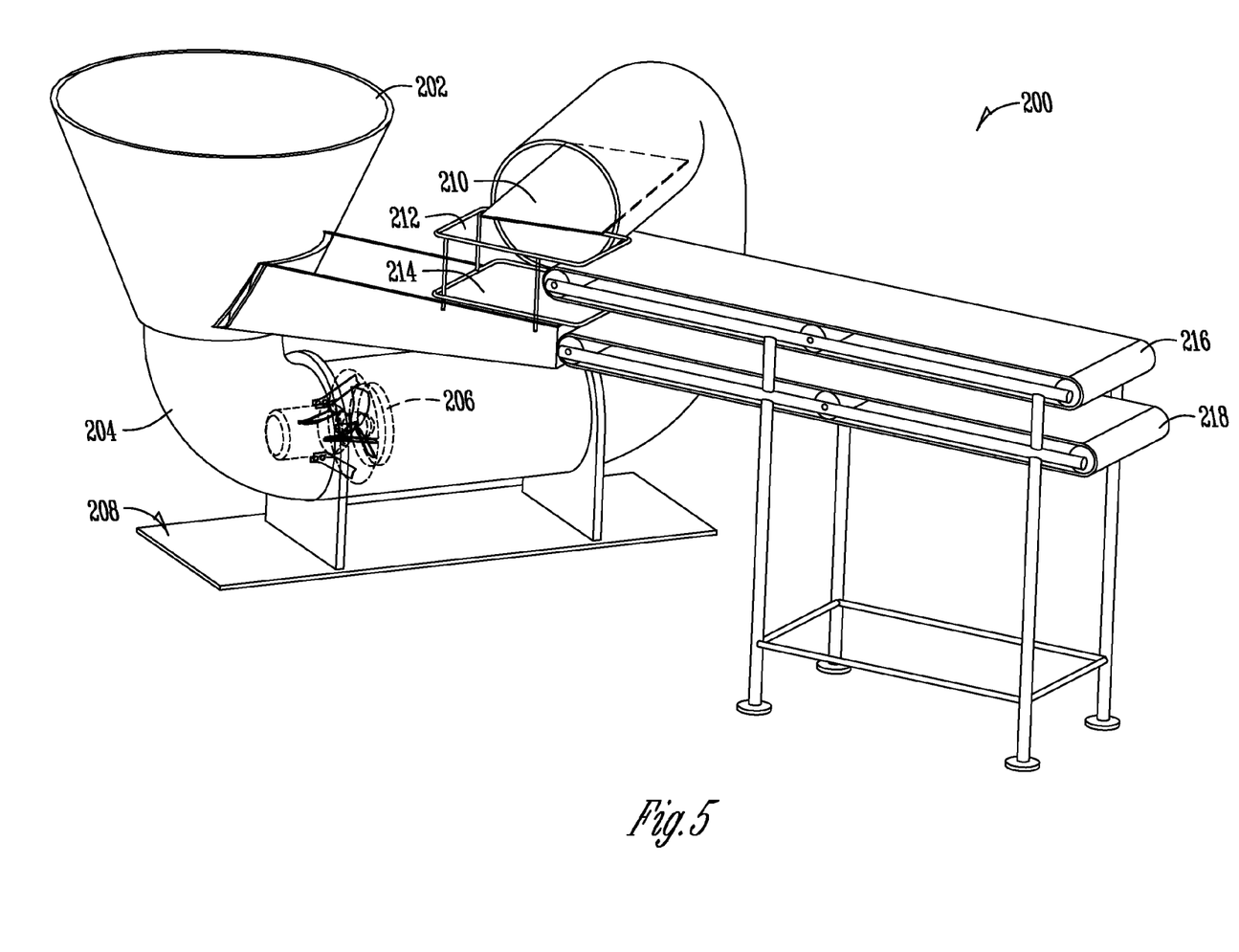
FIG. 5 is a perspective view of the egg shell membrane separation component shown in FIG. 4.

FIG. 5 is a perspective view of the egg shell membrane separation component 200 showing the outlet of the pipe 204. The pipe separator 210 assists in separately recovering the egg shell membranes and the egg shells, after the cavitation action within the pipe 204 has separated the egg shells from the egg shell membranes. A first mesh sieve 212 is shown for collecting the egg shell membranes which are larger than the egg shells. A second mesh sieve 214 is shown for collecting the egg shells. Note that the fluid used in the egg shell membrane separation component 200 is recycled at the outlet of the pipe 204 and back into the inlet of the pipe 204. The egg shell membrane separation component 200 provides for continuous processing of unseparated egg shells into egg shells and egg shell membranes.

Figure 6:
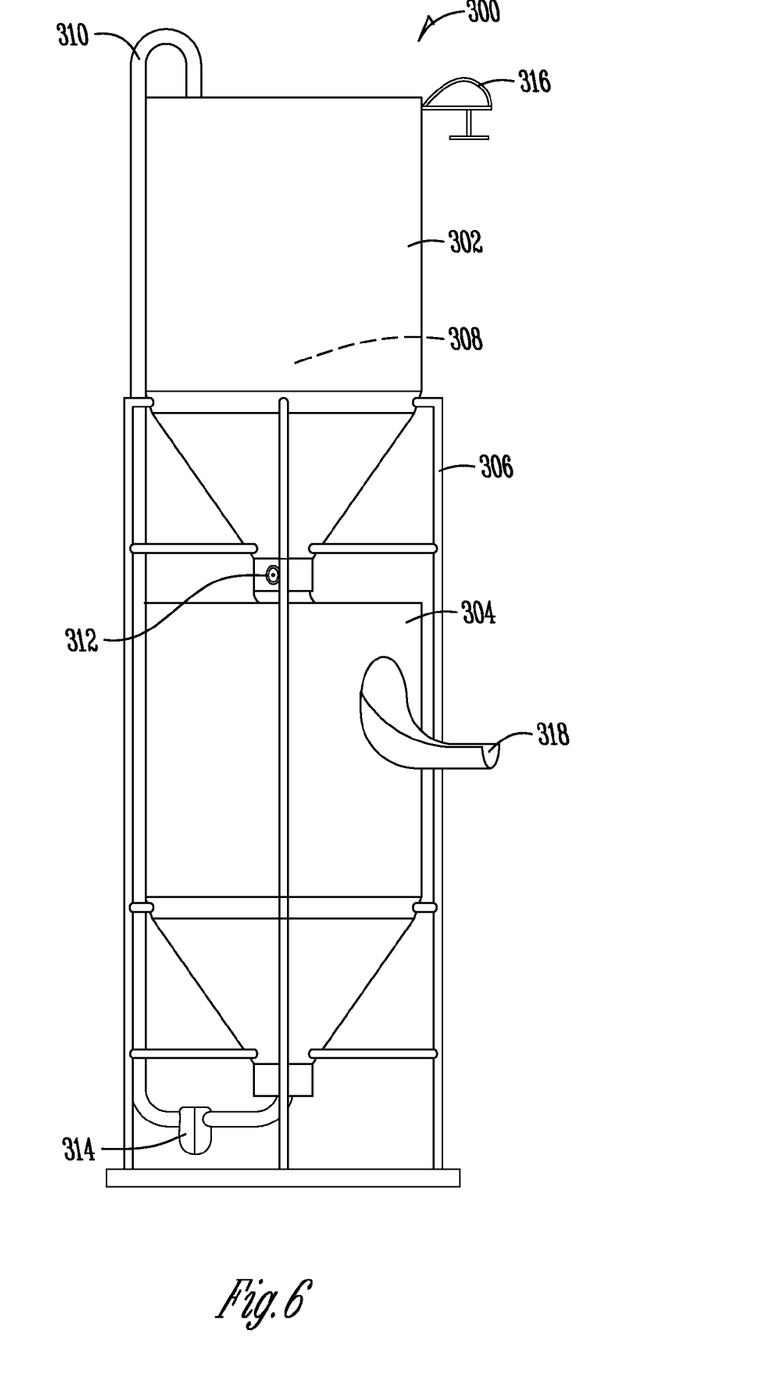
FIG. 6 is a front view of another embodiment of an egg shell membrane separation component.

FIG. 6 is a front view of another embodiment of an egg shell membrane separation component 300. The system 300 includes a first tank 302 and a second tank 304, with the first tank 302 positioned above the second tank 304, the tanks being supported by a support structure 306. The tanks 302, 304 contain a fluid comprising distilled water and acetic acid. A mixer 308 is positioned within the first tank 302 for providing cavitation to assist in separating the egg shells from the egg shell membranes. A membrane sieve 316 is placed within the first tank 302 for collecting egg shell membranes. A valve 312 is positioned at the bottom of the first tank. When the valve 312 is opened, fluid containing the egg shells passes through a mesh pipe filter such that the egg shells are recovered. The fluid from the first tank drains into the second tank where it is filtered and pumped by fluid filter/pump 314 through the fluid recirculation pipe 310 back into the first tank 302.

Returning to FIG. 1, a drying component 24 is shown. The present invention has identified four factors of particular importance to be considered in the drying process. These factors are temperature, moisture, speed, and size of particles. With respect to temperature, the drying component 24 should provide for drying the egg shell membrane in a manner that does not damage material which is to be later extracted. For example, where the material to be extracted is collagen, the drying must be at a temperature lower than the melting point of collagen, such as less than 50 degrees Celsius, and preferably less than about 40 degrees Celsius. For extraction of collagen, the present inventor has determined that a range of about 3 percent to 10 percent moisture (or any value within in this range) as the moisture level for the eggshell membrane is preferred. With respect to speed, the faster the drying process the less contamination. Wet egg shell membranes are highly problematic as they are a virtual breeding ground for pathogens such as harmful bacteria, including phytophagous bacteria (bacteria which eats plant tissue). Therefore, it is advantageous to dry the egg shell membranes quickly with quick evaporation. With respect to size of particles, the present inventor has found a preferred range for the size of particles to be bigger than about 3-4 mm in size, preferably in the range of about 4 mm to about 7 mm.

The present inventor has tested various types of drying components, including infrared drying, spray drying, conductive heating, and freeze drying and has found infrared heating to be preferable. Examples of infrared heating component which can be used include those which are commercially available from MCD Technologies of Tacoma, Wash., USA. The present invention further contemplates that the infrared heating can be combined with conductive heating to thereby further decrease the amount of heating time. Infrared heating is preferred over spray drying as with spray drying, increased bacteria levels have been observed. Infrared heating is preferred over freeze drying as freeze drying is generally impracticable in the context of a hatchery environment. In addition, the cost of freeze drying can be high.

In another embodiment, the drying component uses the REFRACTANCE WINDOW drying technology of MCD Technologies which incorporates infrared heating. In this process, the wet egg shell membranes are placed on the top surface of a continuous sheet of special plastic. The conveyor belt floats upon a surface of hot water. Infrared energy in the circulating water beneath the belt passes directly into the moist product. This rapidly dries it at atmospheric pressure rather than under a vacuum. Such a drying component is further described in U.S. Pat. No. 6,047,484 to Bolland, et al., hereby incorporated by reference in its entirety. Where a conveyor belt is used, it is preferred that the wet membranes are taken in a single layer format to thereby promote quick drying.

Returning to FIG. 1, a vacuum packaging component 34 is shown. The present invention provides for vacuum packaging dried egg shell membranes for storage or transport off site to a location remote from the hatchery. Numerous types of commercially available vacuum packaging systems can be used. Such a system is used to package the egg shell membranes in vacuum sealed plastic bags or other containers. Of course, the present invention is not limited to the particular type of vacuum packing system used.

Although specific embodiments of the present invention are provided herein, the present invention is not to be limited to these embodiments. The present invention contemplates numerous variations in the specific methodology used and the specific structures used. One skilled in the art having the benefit of this disclosure will understand that numerous variations and substitutions are within the spirit and scope of the invention.

What is claimed is:

1. A method for processing unseparated egg shells, comprising:
   placing unseparated egg shells in a container having upstream and downstream ends and containing a fluid mixture;
   treating the unseparated egg shells by applying cavitation to the fluid mixture using a submersible mixer placed within the fluid mixture to thereby produce egg shell membranes and clean egg shells;
   recovering the egg shell membranes adjacent the downstream end of the container.

2. The method of claim 1 further comprising recovering the egg shells adjacent the downstream end of the container.

3. The method of claim 1 wherein the step of separating egg shell membranes from the egg shells being performed by equipment providing for continuous processing of unseparated egg shells.

4. The method of claim 3 wherein the step of separating egg shell membranes from the egg shells further comprises recirculating the fluid mixture.

5. The method of claim 1 wherein the fluid mixture comprises water.

6. The method of claim 1 further comprising processing the eggshell membranes to recover a polypeptide from the eggshell membranes.

7. The method of claim 6 wherein the polypeptide comprises a protein.

8. The method of claim 6 wherein the polypeptide comprises collagen.

9. The method of claim 6 wherein the polypeptide is hyaluronic acid.

10. The method of claim 1 further comprising processing the egg shell membranes to recover amino acids from the set of lysine, histidine, arginine, threonine, glutamic acid, proline, glysine, cysteine, valine, methionine, isoleucine, leucine, tyrosine, phenylalanine and tryptophan.

11. A method for processing unseparated egg shells using a container having an upstream and downstream end, the method comprising:
   placing the unseparated egg shells in a fluid mixture;
   rotating cavitation blades adjacent the upstream end of the container to create cavitation in the fluid mixture to treat the unseparated egg shells and thereby produce egg shell membranes and clean egg shells;
   recovering the egg shell membranes;
   recirculating the fluid mixture to thereby provide for continuous processing of unseparated egg shells.

12. The method of claim 11 further comprising recovering the egg shells.

13. The method of claim 12 further comprising recovering an animal nutrition supplement ingredient from the unseparated egg shells.

14. The method of claim 12 further comprising recovering a human nutritional supplement ingredient from the unseparated egg shells.

15. The method of claim 11 further comprising recovering a polypeptide from the egg shell membranes.

16. The method of claim 11 further comprising recovering collagen from the egg shell membranes.

17. The method of claim 11 further comprising extracting a component from the egg shell membrane.

18. The method of claim 17 wherein the component is a cosmetics product ingredient.

19. The method of claim 17 wherein the component is a biomedical product ingredient.

20. The method of claim 17 wherein the component is a nutraceutical product ingredient.

21. The method of claim 11 wherein the egg shell membranes are recovered adjacent the downstream end of the container.

22. A method for processing unseparated egg shells, comprising:
   providing a fluid container having opposite ends and a submersible mixer mounted therein;
   placing unseparated egg shells in a fluid mixture within the fluid container;
   treating the unseparated egg shells by applying cavitation to the fluid mixture using the submersible mixer and thereby produce egg shell membranes and clean egg shells; and
   recovering the egg shell membranes and clean egg shells from one end of the container.

23. A method for processing unseparated egg shells, comprising:
   providing a fluid container having a recirculating loop and a submersible mixer;
   placing unseparated egg shells in a fluid mixture within the fluid container;
   recirculating the fluid mixture through the loop using the submersible mixer;
   using the submersible mixer to treat the unseparated egg shells and thereby produce separate the egg shell membranes and clean egg shells while recirculating the fluid mixture; and
   recovering the egg shell membranes from the fluid mixture.

* * * * *

UNITED STATES PATENT AND TRADEMARK OFFICE
CERTIFICATE OF CORRECTION

| | | |
|---|---|---|
| PATENT NO. | : 7,954,733 B2 | Page 1 of 1 |
| APPLICATION NO. | : 12/512453 | |
| DATED | : June 7, 2011 | |
| INVENTOR(S) | : Vladimir Vlad | |

It is certified that error appears in the above-identified patent and that said Letters Patent is hereby corrected as shown below:

Col. 10, Claim 23, Line 16:
DELETE after produce "separate"

Signed and Sealed this
Nineteenth Day of July, 2011

David J. Kappos
*Director of the United States Patent and Trademark Office*